United States Patent [19]

Langridge

[11] Patent Number: 4,785,500
[45] Date of Patent: Nov. 22, 1988

[54] HINGE ASSEMBLY FOR VEHICLE ACCESSORIES

[75] Inventor: W. T. Langridge, Troy, Mich.

[73] Assignee: Irvin Industries, Inc., Rochester Hills, Mich.

[21] Appl. No.: 61,444

[22] Filed: Jun. 15, 1987

[51] Int. Cl.[4] .............................. E05F 1/08; B60J 3/00
[52] U.S. Cl. ........................................ 16/297; 16/341; 296/97.12
[58] Field of Search ................. 16/297, 303, 337, 342; 296/97 H, 97 K

[56] References Cited

U.S. PATENT DOCUMENTS

| | | | |
|---|---|---|---|
| 2,201,377 | 5/1940 | Schoenheit | 296/97 K |
| 2,220,429 | 11/1940 | Soderberg | 296/97 R |
| 2,454,613 | 11/1948 | Peltier et al. | 296/97 K |
| 3,193,323 | 7/1965 | Herr et al. | 296/97 H |
| 3,199,913 | 8/1965 | Field et al. | 296/97 H |
| 3,655,849 | 4/1972 | Hayashi | 264/515 |
| 3,741,616 | 6/1973 | Mahler et al. | 296/97 R |
| 3,767,256 | 10/1973 | Sarkees | 296/97 K |
| 3,910,627 | 10/1975 | Meyer | 296/97 H |
| 4,070,054 | 1/1978 | Cziptschirsch | 296/97 K |
| 4,364,598 | 12/1982 | Viertel | 296/97 K |
| 4,394,043 | 7/1983 | Moulding et al. | 296/97 H |
| 4,417,761 | 11/1983 | Cziptschirsch et al. | 296/97 H |
| 4,428,612 | 1/1984 | Viertel et al. | 296/97 K |
| 4,469,367 | 9/1984 | Kuttler et al. | 296/97 K |
| 4,489,974 | 12/1984 | Warhol | 296/97 K |
| 4,500,131 | 2/1985 | Fleming | 296/97 K |
| 4,617,699 | 10/1986 | Nakamura | 296/97 K |

FOREIGN PATENT DOCUMENTS

| | | |
|---|---|---|
| 2757973 | 7/1978 | Fed. Rep. of Germany . |
| 3002124 | 7/1981 | Fed. Rep. of Germany . |
| 3133688 | 3/1983 | Fed. Rep. of Germany . |
| 8300846 | 3/1983 | Fed. Rep. of Germany . |
| 2458415 | 1/1981 | France . |
| 57-209422 | 12/1982 | Japan . |
| 59-20724 | 2/1984 | Japan . |
| 1422368 | 1/1976 | United Kingdom . |
| 1452220 | 10/1976 | United Kingdom . |
| 2034397 | 6/1980 | United Kingdom . |
| 2061210 | 5/1981 | United Kingdom . |
| 2108451 | 5/1983 | United Kingdom . |

Primary Examiner—Nicholas P. Godici
Assistant Examiner—Edward A. Brown
Attorney, Agent, or Firm—Harness, Dickey & Pierce

[57] ABSTRACT

A hinge assembly is disclosed for application in pivotable or rotatable vehicle accessories, such as visors, vanity covers, storage covers, or other vehicular or non-vehicular applications. A preferred, one-piece resilient sleeve member frictionally engages a preferably compact pivot rod and retains the rotated member in any of a number of pre-adjusted pivoted positions, while still providing for one or more positive, pre-determined detent positions.

13 Claims, 2 Drawing Sheets

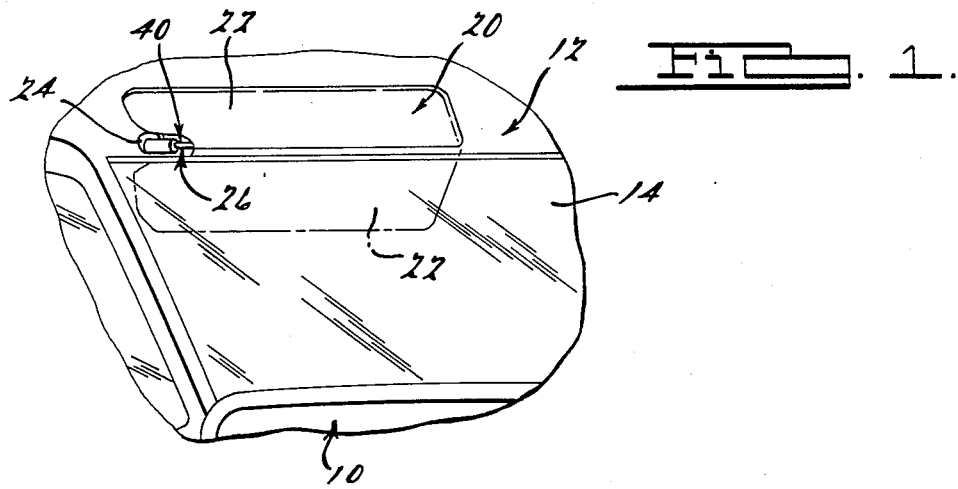
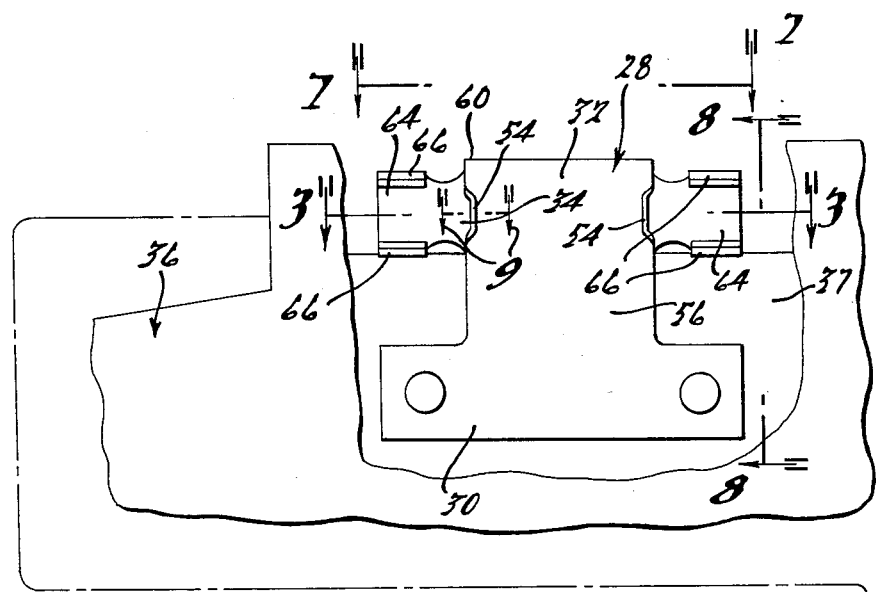

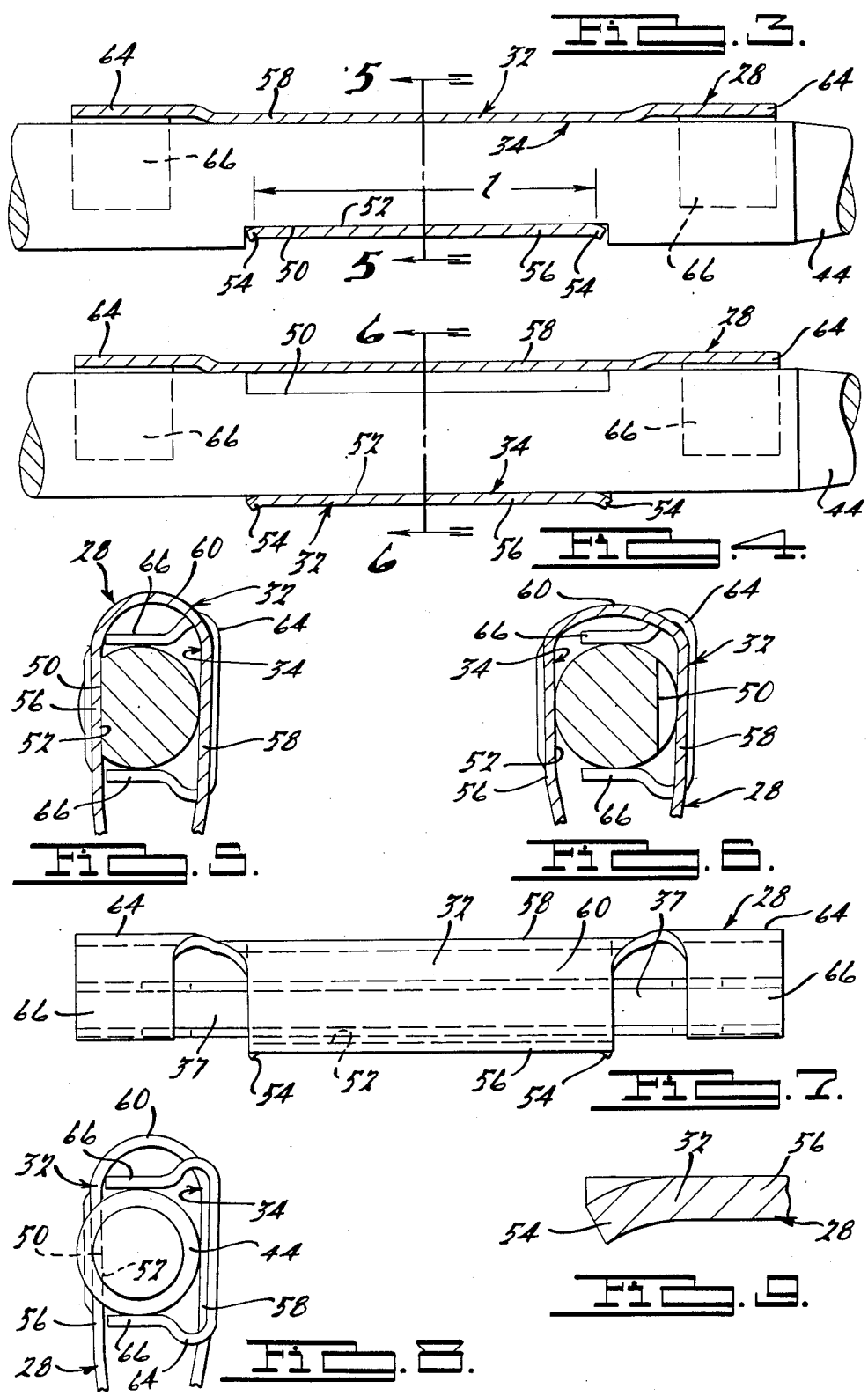

HINGE ASSEMBLY FOR VEHICLE ACCESSORIES

BACKGROUND AND SUMMARY OF THE INVENTION

The present invention relates generally to hinge assemblies for hinged or pivotally interconnected members, and more particularly to such hinge assemblies especially adapted for pivotally interconnecting a sun visor with the interior of a vehicle. Hinge assemblies according to the present invention are also applicable for pivotally mounting other vehicle accessories, such as vanity doors, storage compartment doors, or other accessories or accessory covers. The various embodiments of the hinge assembly according to the present invention can also be employed for various non-vehicular uses, as will be appreciated by one skilled in the art.

The typical vehicle includes a wide variety of hinged or pivotally mounted vehicle accessories or accessory covers in the interior, luggage storage areas, or engine compartment. Although most of the prior hinge assemblies for such accessories have performed quite well, some previous hinge assemblies for such vehicular applications, as well as for various non-vehicular applications, either have not been sufficiently durable or have been expensive to produce and install. Furthermore, some of such prior hinge assemblies have been found to be inordinately bulky, unsightly, or ill-fitting, all of which detract from the user's perception of quality with regard to the vehicle or other device in which such hinge assemblies are included.

In addition to the above disadvantages, many of the prior hinge assemblies have not provided the user with a well-defined, positive stored or closed detent position for the movably hinges member, while still allowing for a virtually unlimited variety of other selectively variable rotated or pivoted positions in which the movable hinged member can be held and maintained, especially after extended use and wear of the hinge components. The need has therefore arisen for a hinge assembly of the type described above, which is simple and inexpensive to produce, assemble and install, that is highly durable, and that is capable of repeatably maintaining the movable hinged member in a predefined and tight-fitting stored or closed position, and that provides for a very wide variety of selectively adjustable rotational or pivotal orientations.

The present invention also allows for the use of a relatively compact hinge assembly, having a minimum number of parts or components, while still providing for a high degree of utility and a wide range of flexibility. In this regard, the invention allows for the use of a relatively short pivot rod and a one-piece sleeve or bracket member that resiliently retains the movable hinged member in the above-mentioned stored or closed detent position and selectively variable positions, without also creating a second, unwanted detent position on the opposite side of the pivot rod from the stored or closed detent position. The preferred forms of the present invention further accomplish these objectives while providing for enhanced lateral support, alignment and stability, thus accommodating the use of a relatively low-cost hinge assembly having a relatively short pivot rod and a one-piece sleeve bracket.

According to the present invention, a hinge assembly is adapted for pivotally interconnecting a first member, such as a vehicle interior, with a second member, such as a sun visor or other vehicle accessory or accessory cover. The hinge assembly according to the present invention, includes a longitudinally-extending pivot rod member that is interconnectable with the first member and longitudinally received within a generally hollow longitudinally-extending sleeve member interconnected with the second member. The rod member is relatively rotatable within the sleeve member and resiliently biased against the interior within the sleeve member. Such resilient biasing force provides for a frictional relative rotational engagement between the rod member and the sleeve member. The resilient biasing force is preferably provided by the sleeve member itself, which is preferably a one-piece structure composed of a resilient material, such as spring steel for example.

The pivot rod member includes a generally flat (or recessed) portion on one side, with the interior surface of the sleeve member being adapted to generally flatly engage the flat rod portion only when the first and second members are in a preselected relatively rotated "detent" position and to substantially prevent such generally flat engagement when the first and second members are in other relatively rotated positions. This relationship is preferably accomplished by way of a first generally flat portion on one side of the sleeve interior that has a longitudinal dimension less than that of the flat rod portion, with other portions of the sleeve interior being either non-engageable by the flat rod portion or having longitudinal dimensions greater than that of the flat rod portion in order to effectively span the flat rod portion, thus substantially preventing such flat internal engagement.

In addition, the preferred sleeve member includes lateral support structure at opposite longitudinal ends of the sleeve member for laterally supporting the pivot rod member in a generally laterally aligned relationship with the sleeve member. This preferred feature, along with those discussed above, allows the preferred sleeve member to be a compact, one-piece structure and allow for a compact pivot rod member having a longitudinal length that is very substantially less than the length of the second member, if desired in a particular application, thus resulting in a neat, simple and compact hinge assembly.

It should be noted that in various embodiments of the present invention, the above-discussed flat engagement of the pivot rod member with the sleeve interior can optionally be provided at a more than one relatively rotated "detent" position of the first and second members, if desired or deemed necessary in a given application.

Additional objects, advantages and features of the present invention will become apparent from the following description and the appended claims, taken in conjunction with the accompanying drawings.

BRIEF DESCRIPTION OF THE DRAWINGS

FIG. 1 is a partial perspective view of the interior of a vehicle, illustrating a hinge assembly according to the present invention for pivotally interconnecting a sun visor with a headliner of the vehicle interior.

FIG. 2 is a partial exploded view of the hinge assembly of FIG. 1.

FIG. 3 is a partial longitudinal cross-sectional view of the sleeve member and pivot rod components of the hinge assembly shown in FIG. 2, taken generally along line 3—3 of FIG. 2.

FIG. 4 is a partial longitudinal cross-sectional view similar to that of FIG. 3, but illustrating the pivot rod in a different rotational position relative to the sleeve member.

FIG. 5 is a partial lateral cross-sectional view of the hinge assembly of FIGS. 1 through 4, taken generally along line 5—5 of FIG. 3.

FIG. 6 is a partial lateral cross-sectional view similar to that of FIG. 5, but taken generally along line 6—6 of FIG. 4.

FIG. 7 is a partial top view of the hinge assembly according to the present invention.

FIG. 8 is a partial end view, taken generally along line 8—8 of FIG. 2.

FIG. 9 is a partial cross-sectional view taken generally along line 9—9 of FIG. 2.

DETAILED DESCRIPTION OF THE PREFERRED EMBODIMENTS

FIGS. 1 through 9 illustrate various embodiments of hinge assemblies according to the present invention, which are shown incorporated in one merely exemplary vehicle interior application. One skilled in the art will readily recognize from the discussion and drawings herein that the principles of the present invention are equally applicable to hinge assemblies other than those shown in FIGS. 1 through 9, for use in vehicle accessories other than the sun visor application shown in the drawings, as well as in other vehicular or non-vehicular applications.

In FIG. 1, a vehicle 10 includes an interior 12, defined in part by a windshield or window 14. A sun visor assembly 20 is included in the vehicle interior 12 and includes a visor 22 pivotally interconnected with the interior 12 by way of a mounting bracket 24 and a hinge assembly 26 according to the present invention.

As shown in FIGS. 2 through 9, the hinge assembly 26 includes a sleeve member 28, which has a gripping portion 30 secured to the visor 22, a preferred generally U-shaped sleeve portion 32, and an interior sleeve surface 34. A decorative or padded covering 36 is typically provided on a center board 37 of the visor 22 and also preferably covers the sleeve member 28, in order to substantially conceal the hinge assembly 26.

A pivot rod member 40 extends longitudinally through the sleeve portion 32 to be rotationally received therein in slidable and rotatable engagement with the interior sleeve surface 34. The pivot rod 40 includes an outer end 42, which is preferably angled and adapted to be pivotally secured to the vehicle interior 12 by way of the mounting bracket 24 in a manner well-known to those skilled in the art. The rod 40 also includes a preferably tapered inner end 44 disposed within the sleeve portion 32 to allow for ease of installation into the sleeve portion 32.

The pivot rod 40, which is preferably of a generally cylindrical cross-section, includes a generally flat portion 50 formed on, and preferably recessed into, one of its sides. The flat portion 50 is adapted to be generally flatly engaged by a first generally flat portion 52 on the interior sleeve surface 34 when the visor 22 is pivoted or rotated to a predetermined "detent" position relative to the vehicle interior 12. Such detent position can correspond to virtually any relatively rotated position of the visor 22, but preferably corresponds to the visor's stored or "up" position shown in solid lines in FIG. 1, at least in the exemplary embodiment of the invention shown for purposes of illustration in the drawings.

Preferably the longitudinal length "1" of the sleeve interior flat portion 52 is less than the longitudinal length of the flat portion 50 on the pivot rod 40 in order to provide for the generally flat engagement between the sleeve flat portion 52 and the rod flat portion 50, which results in the detent relationship therebetween when the visor is in its predetermined detent position relative to the vehicle interior 12. Preferably the sleeve flat portion 52 has angled or flared ends 54 (as perhaps best shown in FIGS. 2 through 4, 7 and 9) in order to facilitate the flush engagement of the sleeve flat portion 52 within the preferably inwardly recessed rod flat portion 50.

The remainder of the sleeve interior surfaces 34 (of those portions that are engageable by the pivot rod 40) preferably have longitudinal dimensions that are greater than the longitudinal length of the flat rod portion 50 so that the above-discussed flat engagement with the flat rod portion 50 occurs only at the predetermined detent position of the visor 22 relative to the vehicle interior 12. It should be noted that although only one of such predetermined detent positions is provided by the embodiment shown in the drawings, one skilled in the art will readily recognize that more than one detent position can be provided, if desired, merely by providing more than one flat rod portion 50 or more than one flat sleeve interior portions 52 that are of a length suitable to allow such flat engagement.

As perhaps best shown in FIGS. 5, 6 and 8, the sleeve portion 32 of the sleeve member 28 is preferably generally U-shaped in lateral cross-section and has a pair of sleeve legs 56 and 58 interconnected by a base portion 60. Because of the preferred resilient composition (spring steel, for example) of the sleeve member 28, the legs 56 and 58 are preloaded to resiliently and frictionally engage the sides of the pivot rod 40, thus providing the holding force thereon necessary to retain the visor 22 in virtually any preselected rotated position relative to the pivot rod 40 and thus the vehicle interior 12. Such preferred resiliency and configuration thus also causes the sleeve member 28 (and its legs 56 and 58) to resiliently urge or "snap" the visor 22 into the above-mentioned predetermined detent position whenever the visor 22 is rotated to a position that is in relatively close rotational proximity with the predetermined detent position. In all other rotated positions, however, the visor is retained in a preselected position as mentioned above.

The sleeve member 28 also preferably includes a lateral support portion 64 generally adjacent each longitudinal end of the sleeve leg 58. The lateral support portions 64 are each preferably generally U-shaped in lateral cross-section, with a pair of spaced support legs 66 protruding laterally toward and around the pivot rod 40. The support legs 66 resiliently and frictionally engage the cylindrical outer surface of the pivot rod 40 and serve to laterally support the pivot rod 40, thus substantially maintaining its proper lateral alignment with the sleeve portion 32 of the sleeve member 28. In addition, the support legs 66 tend to bias the pivot rod 40 in a direction generally away from the sleeve leg 58 and toward the sleeve leg 56 and the flat surface portion 52, thus contributing to the above-discussed positive detent function when the visor 22 is rotated to the stored or "up" position (or other predetermined detent position) relative to the vehicle interior 12. In this regard, it is preferred that the sleeve leg 58 is laterally offset in a generally inward direction relative to the bases of the lateral support portions 64 so that the resilient sleeve legs 56 and 58 resiliently and frictionally engage the pivot rod 40, regardless of whether the pivot rod 40 and the sleeve member 28 are in the detent position shown in FIG. 5 or any other relatively rotated position, as shown in FIG. 6. This arrangement can be clearly seen by comparing the degree of speading of the sleeve legs 56 and 58 in FIGS. 5 and 8 as compared to that of FIG. 6.

The arrangement, configuration and relationship of the components of the hinge assembly 26 allow the hinge assembly 26 to be compact and very substantially shorter than the visor 22, as well as allowing for a simple, one-piece sleeve member 20 that provides the necessary lateral support for such a short pivot rod 40. This contributes greatly to the design flexibility, economy and neatness of the visor installation in a vehicle, or in other vehicle accessories that include hinged members, while still providing for maximum rotational adjustability and a well-defined, positive retention of the hinged member in its stored or other predetermined detent position in visors, vanity doors, storage compartment covers or other vehicular or non-vehicular accessories.

The foregoing discussion discloses and describes exemplary embodiments of the present invention. One skilled in the art will readily recognize from such discussion, and from the accompanying claims and drawings, that various changes, modifications and variations may be made therein without departing from the spirit and scope of the invention as defined in the following claims.

What is claimed is:

1. A hinge assembly for pivotally interconnecting a first member with a second member for relative rotational movement, said hinge assembly comprising: a longitudinally-extending pivot rod member interconnected with the first member; and a longitudinally-extending sleeve member having a sleeve opening with an interior surface extending longitudinally therethrough; said sleeve member being interconnected with the second member for receiving said pivot rod member for relative rotation therewithin, said sleeve member including resilient biasing means for resiliently biasing a portion of said pivot member generally laterally against said interior surface of said sleeve member in order to provide a frictional relative rotational engagement between said pivot rod member and said interior surface of said sleeve member; said pivot rod member having a generally flat rod portion thereon; and said interior surface of said sleeve member further including means for generally flatly engaging said flat rod portion when said first and second members are in a predetermined relatively rotated detent position and for substantially preventing said generally flat engagement with said flat rod portion when said first and second members are in other relatively rotated positions, said sleeve member including lateral support means for laterally and resiliently supporting said pivot rod member in a generally laterally aligned position relative to said sleeve opening in said sleeve member, said lateral support means including a support portion of said sleeve member extending longitudinally outwardly from each longitudinal end thereof, said support portions each being resilient and generally U-shaped in configuration with a pair of support legs extending laterally therefrom for resiliently engaging said pivot rod member, said pivot rod member being frictionally and rotationally received between said support legs of each of said support portions and laterally supported thereby.

2. A hinge assembly according to claim 1, wherein said sleeve member is a one-piece structure, said resilient biasing means being integrally formed with said one-piece sleeve member.

3. A hinge assembly for pivotally interconnecting a first member with a second member for relative rotational movement, said hinge assembly comprising: a longitudinally-extending pivot rod member interconnected with the first member; and a longitudinally-extending sleeve member having a sleeve opening with an interior surface extending longitudinally therethrough; said sleeve member being interconnected with the second member for receiving said pivot rod member for relative rotation therewithin, said sleeve member including resilient biasing means for resiliently biasing a portion of said pivot member generally laterally against said interior surface of said sleeve member in order to provide a frictional relative rotational engagement between said pivot rod member and said interior surface of said sleeve member; said pivot rod member having a generally flat rod portion thereon; and said interior surface of said sleeve member further including means for generally flatly engaging said flat rod portion when said first and second members are in a predetermined relatively rotated detent position and for substantially preventing said generally flat engagement with said flat rod portion when said first and second members are in other relatively rotated positions, said sleeve member being generally U-shaped in configuration and having a pair of generally parallel spaced apart sleeve legs extending laterally therefrom and defining said sleeve opening therebetween, said sleeve legs frictionally and resiliently engaging opposite sides of said pivot rod member rotationally received therebetween, a first of said sleeve legs including a generally flat interior portion having a longitudinal dimension less than the longitudinal length of said flat rod portion for generally flatly and resiliently engaging said flat rod portion when said first and second members are in said predetermined detent position, a second of said sleeve legs having a longitudinal dimension greater than the longitudinal length of said flat rod portion for substantially spanning said flat rod portion and for substantially preventing a generally flat engagement of said flat rod portion with the interior surface of said sleeve member when said first and second members are in said other relatively rotated positions, said sleeve member including lateral support means for laterally and resiliently supporting said pivot rod member in a generally laterally aligned position relative to said sleeve opening in said sleeve member, said lateral support means including a support portion of said sleeve member extending longitudinally outwardly from each longitudinal end thereof, said support portions each being resilient and generally U-shaped in configuration with a pair of support legs extending laterally therefrom for resiliently engaging said pivot rod member, said pivot rod member being frictionally and rotationally received between said support legs of each of said support portions and laterally supported thereby.

4. A hinge assembly according to claim 3, wherein said sleeve member also includes a lateral support portion extending longitudinally outwardly from each longitudinal end of said second sleeve leg for laterally supporting said pivot rod member in a generally laterally aligned position relative to said sleeve opening, said lateral support portions each being of a generally U-shaped configuration with a pair of support legs extending laterally therefrom, said pivot rod member being frictionally and rotationally received between said support legs of said support portions and laterally supported thereby at positions generally longitudinally outward of said flat rod portion.

5. A hinge assembly according to claim 4, wherein said sleeve member is a one-piece structure composed of a resilient material.

6. A hinge assembly according to claim 5, wherein the first and second members comprise a vehicle interior and a vehicle sun visor, respectively, said sleeve member including means for interconnection of said sleeve member to the sun visor, said pivot rod member including means thereon for interconnecting said pivot rod member to the vehicle interior.

7. A hinge assembly according to claim 6, wherein said pivot rod member is pivotally interconnectable with the vehicle interior.

8. A visor hinge assembly for pivotally interconnecting a vehicle window visor with the interior of the vehicle for rotational movement relative thereto, said visor hinge assembly comprising:
 a longitudinally-extending pivot rod member interconnectable with the interior of the vehicle, said pivot rod member having a generally flat rod portion recessed inwardly therein; and
 a longitudinally-extending sleeve member interconnected with the visor and having a sleeve opening extending longitudinally therethrough and defining an interior surface of said sleeve member, said sleeve opening being in part defined by a pair of generally parallel spaced apart sleeve leg portions of said sleeve member extending laterally on opposite sides of said pivot rod member, said sleeve leg portions frictionally and resiliently engaging said opposite sides of said pivot rod member rotationally received therebetween, a first of said sleeve leg portions including a generally flat interior portion having a longitudinal dimension less than the longitudinal length of said flat rod portion for generally flatly and resiliently engaging said flat rod portion when the visor is pivoted to a predetermined rotational detent position relative to the vehicle interior, a second of said sleeve leg portions having a longitudinal dimension greater than the longitudinal length of said flat rod portion for substantially spanning said flat rod portion and for substantially preventing a generally flat engagement of said flat rod portion with the interior surface of said sleeve member when the visor is in other rotated positions relative to the vehicle interior said sleeve member also including a lateral support portion extending longitudinally outwardly from each longitudinal end of said second sleeve leg portion for laterally supporting said pivot rod member in a generally laterally aligned position relative to said sleeve opening, said lateral support portions each being resilient and of a generally U-shaped configuration with a pair of support legs extending laterally therefrom for resiliently engaging said pivot rod member, said pivot rod member being frictionally and rotationally received between said support legs of said support portions and laterally supported thereby at positions generally longitudinally outward of said flat rod portion.

9. A hinge assembly according to claim 8, wherein said sleeve member is a one-piece structure composed of a resilient material.

10. A hinge assembly according to claim 8, wherein said pivot rod member and said sleeve member each have a longitudinal length substantially less than that of the visor, said sleeve member being interconnected with the visor generally adjacent one longitudinal end of the visor.

11. A hinge assembly according to claim 10, wherein said pivot rod member is pivotally interconnectable with the vehicle interior.

12. A vehicle accessory hinge assembly for pivotally interconnecting a vehicle accessory cover with a vehicle accessory for rotational movement relative thereto, said vehicle accessory hinge assembly comprising:
 a longitudinally-extending pivot rod member interconnectable with the vehicle accessory, said pivot rod member having a generally flat rod portion recessed inwardly therein; and
 a longitudinally-extending sleeve member interconnected with the accessory cover and having a sleeve opening extending longitudinally therethrough and defining an interior surface of said sleeve member, said sleeve opening being in part defined by a pair of generally parallel spaced apart sleeve leg portions of said sleeve member extending laterally on opposite sides of said pivot rod member, said sleeve leg portions frictionally and resiliently engaging said opposite sides of said pivot rod member rotationally received therebetween, a first of said sleeve leg portions including a generally flat interior portion having a longitudinal dimension less than the longitudinal length of said flat rod portion for generally flatly and resiliently engaging said flat rod portion when the accessory cover is pivoted to a predetermined rotational detent position relative to the vehicle accessory, a second of said sleeve leg portions having a longitudinal dimension greater than the longitudinal length of said flat rod portion for substantially spanning said flat rod portion and for substantially preventing a generally flat engagement of said flat rod portion with the interior surface of said sleeve member when the accessory cover is in other rotated positions relative to the vehicle accessory said sleeve member also including a lateral support portion extending longitudinally outwardly from each longitudinal end of said second sleeve leg portion for laterally supporting said pivot rod member in a generally laterally aligned position relative to said sleeve opening, said lateral support portions each being resilient and of a generally U-shaped configuration with a pair of support legs extending laterally therefrom for resiliently engaging said pivot rod member, said pivot rod member being frictionally and rotationally received between said support legs of said support portions and laterally supported thereby at positions generally longitudinally outward of said flat rod portion.

13. A vehicle accessory hinge assembly according to claim 12, wherein said sleeve member is a one-piece structure composed of a resilient material.

* * * * *

UNITED STATES PATENT AND TRADEMARK OFFICE
CERTIFICATE OF CORRECTION

PATENT NO. : 4,785,500

DATED : November 22, 1988

INVENTOR(S) : W. T. Langridge

It is certified that error appears in the above-identified patent and that said Letters Patent is hereby corrected as shown below:

Column 1, line 35, "movably" should be --movable--.

Column 1, line 35, "hinges" should be --hinged--.

Column 5, line 7, "speading" should be --spreading--.

Signed and Sealed this

Nineteenth Day of December, 1989

Attest:

JEFFREY M. SAMUELS

*Attesting Officer*  *Acting Commissioner of Patents and Trademarks*